INVENTORS
Carl-Helmut Dederra
Karl Butter

United States Patent Office 3,692,637
Patented Sept. 19, 1972

3,692,637
**METHOD OF FABRICATING A HOLLOW STRUC-
TURE HAVING COOLING CHANNELS**
Carl-Helmut Dederra, 87a Mozartstrasse, 8012 Otto-
brunn, Germany, and Karl Butter, 17 Hans Denziger
Str., 8 Munich 13, Germany
Original application Nov. 15, 1967, Ser. No. 683,176.
Divided and this application Nov. 24, 1969, Ser. No.
877,591
Int. Cl. C03b 7/02
U.S. Cl. 204—9
2 Claims

ABSTRACT OF THE DISCLOSURE

A method of fabricating a structural part for use as a wall of a device subject to high temperatures, such as a rocket combustion chamber, a heat shield, or a nose cone of a missile wherein individual tubular elements having either an opened or a closed cross section are fitted together to form a wall and are connected in a mechanically strong and pressure proof manner by a layer of material which is applied galvanoplastically on either one or both sides thereof. Various structural configurations are possible and in some instances the resultant structure is reinforced by a reinforcing member such as a steel strip.

---

This is a division of application Ser. No. 683,176, filed Nov. 15, 1967.

In the method of the invention, structural parts which are adapted to be liquid cooled are formed of small tubular elements which are arranged together and thereafter the cracks or joints between the elements are filled with a filling material which has an electrically conductive surface, a mechanically strong and pressure proof layer is applied galvanoplastically over the wall formed by the tubular elements and the filling material, and subsequently the filling materials are fused out to leave the interiors void.

SUMMARY OF THE INVENTION

This invention relates, in general, to the construction of structural elements particularly for use as liquid cooled walls of high temperature members and, in particular, to a new and useful structural part particularly for use as rocket combustion chambers, heat shields, missile cones and the like which is made up of individual tubular elements which are bonded together on one or both sides by means of a galvanonically applied layer and to a method of forming such walls.

It is generally known in rocketry to construct liquid cooled combustion chambers and expansion nozzles of such chambers from individual tubular elements of varying dimension and length and variable cross section. A mechanically strong and pressure proof union of the tubes to form a combustion chamber or nozzles is achieved by soldering or welding the individual elements together. When the tubes are united by welding methods, the action of the high temperature in both locally concentrated areas and in widely distributed areas causes undesired deformations of the parts which result from the equalization of the existing mechanical stresses upon heating and by the limiting of the stresses resulting from heating.

Attempts have been made to join the hollow profiles to form closed channels by the use of a flame extruded jacket of metal or other suitable material. A disadvantage of this method is that the metal of such a jacket is brittle and therefore unable to absorb relatively high tensile stresses. If the wall thickness of the jacket is increased to reduce the tensile stress load caused by the internal pressures of the combustion chamber, an undesirable increase of the structural weight will result.

In accordance with the present invention, the disadvantage caused by the action of high temperatures are avoided and a hermetic extremely strong union of tubular or other closed or open profile elements may be carried out in a short time and inexpensively in order to form a structural wall formation. In accordance with the method of the invention, the individual elements are joined together to form a wall outline and the wall outline is made mechanically strong and pressure proof by applying a layer of material on either one or both sides galvanoplastically. In some instances, it is desirable to first fill up the cracks and joints between the individual tubular elements with a material which facilitates the galvanoplastic union of the parts after it is applied. In this manner, an advantageous distribution of the electric field brings about the transfer of the particles to be applied in the galvanic bath. By employing the filling material, the weight of the structural parts is maintained as low as possible in relation to strength. It is preferable to use a filling material of low melting point which, after galvanoplastic application of the layer, will be fused out. By such an arrangement, the entire structural part will consist of the same material throughout, thereby avoiding the possible occurrence of stresses caused by heat expansion of different materials.

The invention also makes it possible to use tubular elements of either opened or closed profiles or cross sections. If the liquid cooled structural part which is to be made is to be made up of a plurality of U-, I- or other open sections forming open channels, then notches, gaps and channels are filled or levelled with fusable filling material having an electrically conductive surface and then connected together with a mechanically strong and pressure proof layer applied galvanoplastically on one or both sides. If the profile shapes are such that they are closed channels, then the same method is employed but the notches and gaps are filled with fusable filling material with electrically conductive surfaces before they are galvanized.

The invention thus makes it possible to provide a relatively inexpensive and simple construction of thermally and mechanically strong structural parts without requiring welding or soldering. In addition, the danger of warping by heat treatment over large or small areas will be avoided. By using tubular elements which are joined together and then treated galvanically to form a galvanoplastic layer thereon, it is necessary to only insert the elements into the bath for a small amount of time since the thickness of the galvanoplastic layer required with the inventive arrangement is only a fraction of the total thickness of the part and therefore with the same manufacturing equipment the production capacity is considerably increased.

Accordingly, it is an object of the invention to provide a method of forming a structural part, particularly of a type which is to be subject to high temperatures and which will be cooled with liquid comprising assembling a plurality of tubular elements together and forming a galvanoplastic layer on one or both sides of the elements and preferably by first filling the cracks or joints between the elements with a fusable filling material having an electrically conductive surface.

A further object of the invention is to provide a structural element which may be used for high temperature application such as in the linings of combustion chambers, for missile cones and the like, wherein a plurality of tube-like elements with either open or closed profile are arranged alongside each other in the form of the structure to be fabricated with a galvanoplastic layer disposed on at least one side thereof.

A further object of the invention is to provide a structural panel which is capable of being used for high temperature applications and which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
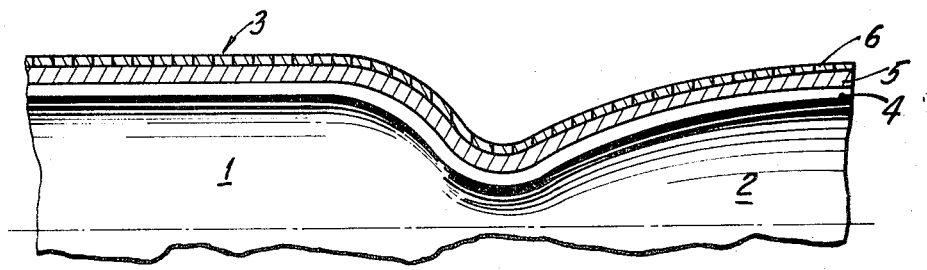
FIG. 1 is a partial longitudinal section of a rocket combustion chamber constructed in accordance with the invention.

Referring to the drawings, in particular, the invention as embodied therein in FIG. 1 comprises a rocket engine having a combustion chamber 1 with a thrust nozzle portion 2 formed from a tubular structure generally designated 3 which is formed in accordance with the invention. In this embodiment, the wall of the tubular element 3 is formed of a plurality of longitudinally arranged tubules or tube-like elements 4 which may have either an opened or closed cross section but which are advantageously constructed to define channels along the length of the combustion chamber for the circulation of a cooling liquid. The tubules 4 are connected together at the exterior or outer side by a galvanoplastically applied layer 5. A steel strip reinforcement 6 is secured to the outer layer 5 in order to insure that the structure 3 will absorb extremely great mechanical stresses such as those which may occur in high performance rocket combustion chambers.

Figure 2:
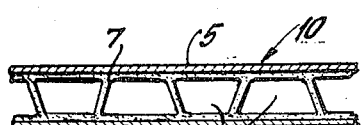
FIGS. 2-9 are partial transverse sectional views through various plane or curved liquid-cooled structural parts of other embodiments of the invention.

In the embodiment indicated in FIG. 2, a plane structural part generally designated 10 is made up of individual tubules 12 which comprise closed tubes of generally trapezoidal configuration which are connected on both sides by a galvanoplastically applied layer 5. Filling material 7 is advantageously applied between the joints of the tubules, and this advantageously comprises a material which has an electrically conductive surface to facilitate this purpose.

Figure 3:
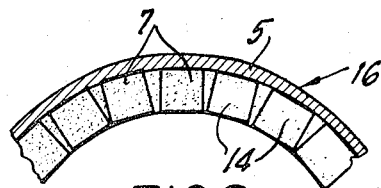

In the embodiment of FIG. 3, tubular or tube elements 14 are of opened profile or cross section and are of a U-shaped configuration with the inner closed side arranged on the inside of the curved structural element 16 which is formed. In this embodiment, the sealing material 7 is of such a nature that it will be fused out during the application of a galvanoplastic layer 5. The fusing out of the material 7 exposes or voids the channels so that they may define liquid passageways, for example, for cooling purposes.

Figure 4:
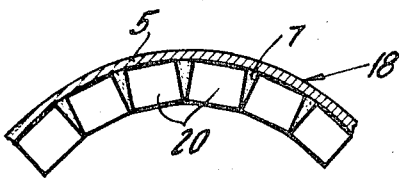
Figure 5:
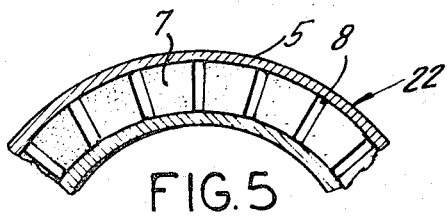

In the embodiment of FIG. 4, a curved or cylindrical structure 18 is formed with tubules 20 of rectangular configuration. The structure 22 indicated in FIG. 5 which includes a galvanoplastic layer 5 on each side includes tubules or tube elements 8 which comprise flat strips. The flat strips 8 are arranged at spaced locations in radial orientation such as by the use of clamps and are arranged so that channels will be formed therebetween which are filled with filling material 7 which will be fused out during the application of the layers 5.

Figure 6:
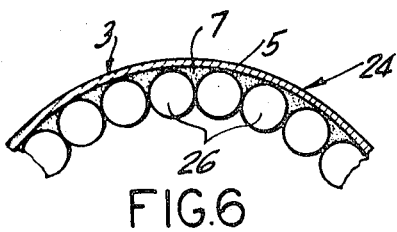

In the embodiment of FIG. 6, a cylindrical structure 24 is formed from tubules or tube eelments 26 of circular or round cross section.

Figure 7:
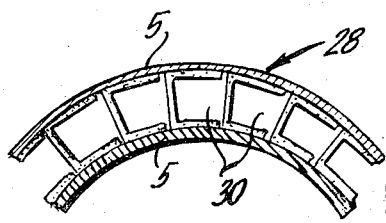

The structural element 28 indicated in FIG. 7 is formed with tubules 30 of substantially C-shaped configuration.

Figure 8:
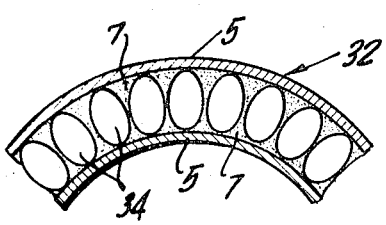
Figure 9:
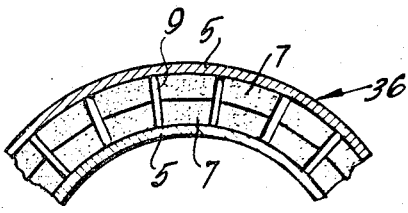

In the embodiment of FIG. 8, the cylindrical structure 32 includes tubules 34 of oval-shaped cross section.

In FIG. 2, a curved structural part 36 is composed of a plurality of tubules or sections 9 of substantially I-shaped configuration which, when arranged as indicated, form two layers of open channels after the filling material 7 is fused out.

While specific embodiments of the invention have been shown and described in detail to illustrate the application of the inventive principles, it will be understood that the invention may be embodied otherwise without departing from such principles.

What is claimed is:

1. A method of producing a rocket combustion chamber wall which is adapted to have a plurality of cooling media channels therethrough defined by hollow tubular elements, said method comprising arranging a plurality of hollow tubes together in substantially parallel side-by-side relationship in a row to form them into a combustion chamber shell with longitudinally extending cooling channels separated by at least the thickness of one said hollow tubes, filling the spaces between the hollow tubes with electrically conductive filling material having a low melting point, applying a layer of electroplated material to at least one side of the row of hollow tubes to bond said hollow tubes together thus covering them and forming a wall with said hollow tubes which extends on at least one side of said hollow tubes, and subsequently fusing out the filling material.

2. A method of producing a rocket combustion chamber wall which is adapted to have a plurality of cooling media channels therethrough defined by a plurality of elements having U or I-shaped configurations with open cross sections and which are formed of flat strips held in spaced relationship, said method comprising arranging a plurality of tubular elements together in substantially parallel side-by-side relationship in a row in order to fabricate the elements into the combustion chamber shell having longitudinally extending cooling channels separated by at least the thickness of one said elements, filling the space between the elements with a filling material of a low melting point and of electrically conductive characteristics, immersing said elements containing the filling material into an electroplating bath in order to apply a layer of electroplated material to each side of the row of elements to bond said elements together thus covering said elements and forming a wall with said elements, said wall extending on each side of said elements, and fusing out of the filling material to expose the space between the strip elements.

References Cited

UNITED STATES PATENTS

| 2,608,529 | 8/1952 | Varian | 29—460 X |
|---|---|---|---|
| 2,687,278 | 8/1954 | Smith et al. | 29—156.8 H |
| 3,192,609 | 7/1965 | Masatake Murata et al. | 29—460 X |
| 3,424,657 | 1/1969 | Fialkoff | 204—9 |
| 3,022,230 | 2/1962 | Fialkoff | 204—9 |
| 3,467,583 | 9/1969 | Naimer | 204—9 |

OTHER REFERENCES

Liquid Rockets and Propellants, edited by Loren E. Bollinger et al., Academic Press, New York (1960), pp. 563–568, 572, 580, 582, 583.

JOHN F. CAMPBELL, Examiner

D. C. REILEY III, Assistant Examiner

U.S. Cl. X.R.

29—156.8 H, 157 C, 460, DIG. 12; 60—267